(12) United States Patent
Avazian et al.

(10) Patent No.: US 7,996,309 B2
(45) Date of Patent: *Aug. 9, 2011

(54) METHOD AND SYSTEM FOR CASH REMITTANCES USING A TWO COUNTRY BANKING STRUCTURE

(75) Inventors: Thomas D. Avazian, Miami, FL (US); Miguel Cintron, Charlotte, NC (US); Marcos Rosenberg, Charlotte, NC (US); Claudia Tabacinic, Hollywood, FL (US); Faith A. Tucker, Wichita, KS (US); Eduardo J. Vergara, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/842,675

(22) Filed: Jul. 23, 2010

(65) Prior Publication Data

US 2010/0287100 A1   Nov. 11, 2010

Related U.S. Application Data

(63) Continuation of application No. 11/162,066, filed on Aug. 26, 2005, now Pat. No. 7,797,234.

(51) Int. Cl.
*G06Q 40/00* (2006.01)

(52) U.S. Cl. .......................................................... 705/39

(58) Field of Classification Search .................... 705/35, 705/39–40, 42–44, 64, 67–70, 73, 75–79; 902/22, 24, 40; 382/137; 235/379
See application file for complete search history.

(56) References Cited

U.S. PATENT DOCUMENTS

| | | | |
|---|---|---|---|
| 5,326,960 A | 7/1994 | Tannenbaum |
| 5,650,604 A | 7/1997 | Marcous |
| 6,269,345 B1 | 7/2001 | Riboud |
| 7,254,557 B1 | 8/2007 | Gillin |
| 2002/0026396 A1 | 2/2002 | Dent |
| 2003/0080185 A1 | 5/2003 | Werther |
| 2003/0208440 A1 | 11/2003 | Harada |
| 2006/0178938 A1 | 8/2006 | Wallace |

OTHER PUBLICATIONS

Bank of America and Santander Serfin Announce New, Advanced SafeSend Features to Benefit Customers on both Sides of the Boarder, PR Newswire, New York, Sep. 29, 2003 p. 1.
Loretta Kalb's, article Bank of America Waives Mexico ATM Transfer Fees, Knight Ridder Tribune Business News, Jan. 24, 1923, p. 1, retrieved from Proquest Sep. 6, 2009. International Search Report and Written Opinion from corresponding PCT Application No. PCT/US06/31587, dated Jul. 3, 2008.
International Preliminary Report on Patentability from corresponding PCT Application No. PCT/US06/031587, dated Mar. 17, 2009.
Functional Requirements for SafeSend Version 3.5, Jan. 17, 2002, pp. 6-67, WildCard Systems, Inc.
Supplementary European Search Report from corresponding PCT Application No. PCT/US2006/031587, dated Oct. 14, 2010, pp. 1-8.

*Primary Examiner* — Mary Cheung
(74) *Attorney, Agent, or Firm* — Banner & Witcoff, Ltd.; Michael Springs

(57) ABSTRACT

A bank customer of a first bank in a first country has a bank account. The bank provides a banking service whereby customer is able to send cash to a recipient in a second country via a commingled bank account belonging to a second bank. The cash is provided to the recipient in the currency of the second country by a third party payment agent. To effect a transfer, the bank customer in the first country instructs the first bank to debit his or her account and send cash to a designated recipient. In response, the first bank debits the customer's account, sends first payment instructions to the second bank, and transfers funds to a commingled account at the second bank. Funds from this commingled account are used to pay for the cash provided to the recipient. The banking service may be provided free of charge to a banking customer of the first bank.

21 Claims, 12 Drawing Sheets

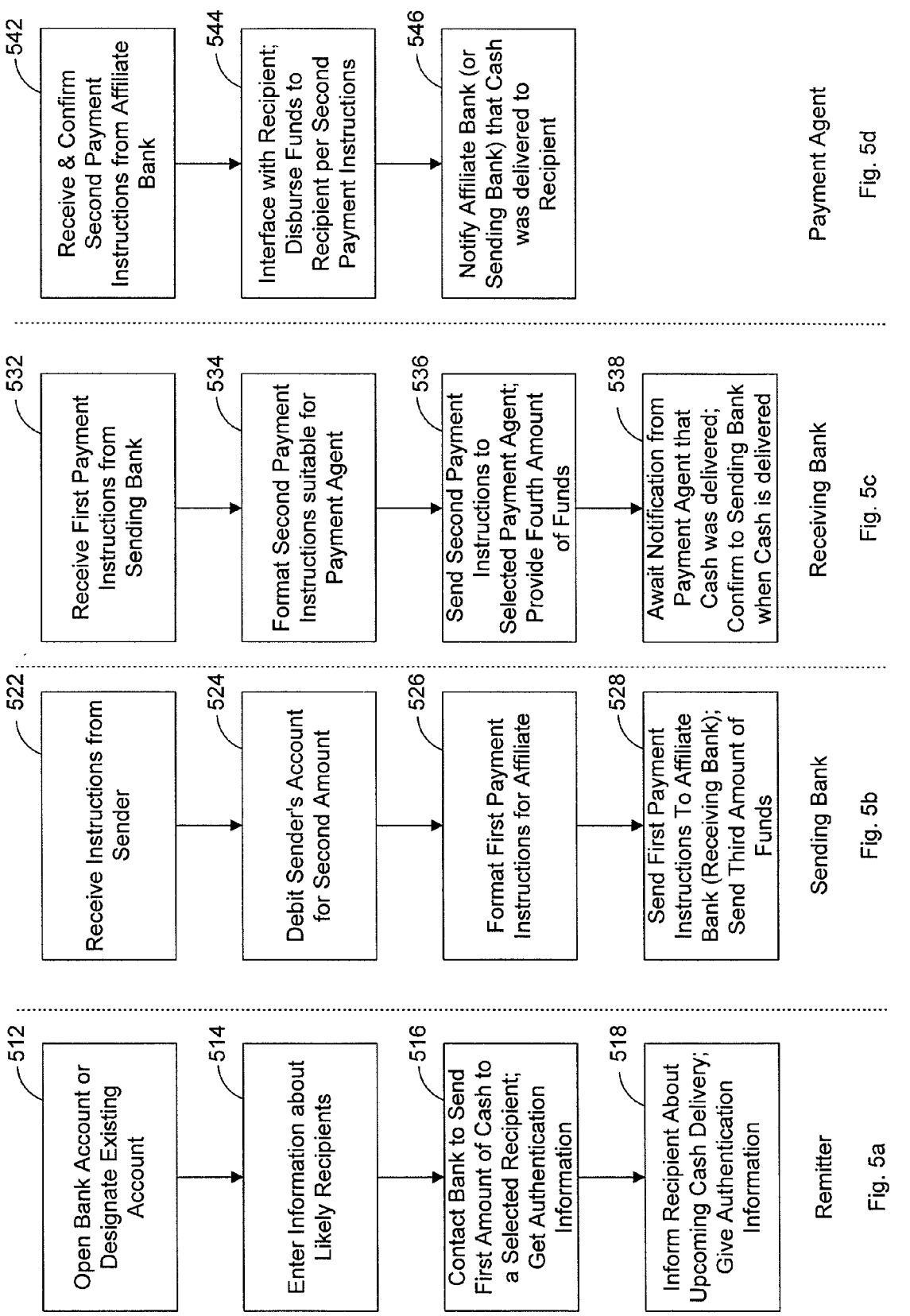

First Payment Instructions

- 702 — Transaction Routing #: xxxxxxxxx
- 704 — Retrieval Access Code: xxxxxxxxx
- 706 — Date: 25-Aug-2005
- 708 — Time: 09:25 GMT
- 709 — Expiration: 27-Aug-2005
- 710 — Amount: MX $1000
- 712 — Sender's Name: Last Name, First name
- 714 — Authentication Code: AAXXXXXX
- 716 — Recipient Name: Last Name, First Name
  - Address1: Street Name
  - Address2: City
  - Address3: State
  - Postal Code: xxxxx
  - Country: Country
  - Phone: xxx-xxx-xxxx
- 718 — Payment Agent: Company

Fig. 7a

Second Payment Instructions

- Transaction Routing #: xxxxxxxxx
- Retrieval Access Code: xxxxxxxxx
- Date: 25-Aug-2005
- Time: 10:57 GMT
- 738 — Expiration: 27-Aug-2005
- Amount: MX $1000
- Sender's Name: Last Name, First Name
- 744 — Verification Code: AAXXXXXX
- 752 — Phone: xxx-xxx-xxxx
- Recipient Name: Last Name, First Name
  - Address1: Street Name
  - Address2: City
  - Address3: State
  - Postal Code: xxxxx
  - Country: Country

METHOD AND SYSTEM FOR CASH REMITTANCES USING A TWO COUNTRY BANKING STRUCTURE

CROSS REFERENCES TO RELATED APPLICATIONS

This application is a continuation of U.S. patent application Ser. No. 11/162,066 entitled "Method and System for Cash Remittances Using a Two Country Banking Structure," filed Aug. 26, 2005, the entire disclosure of which is herein incorporated by reference.

BACKGROUND OF THE INVENTION

1. Field of the Invention

The present invention relates to a method and system for a person in a first country ("remitter" or "sender") to provide cash to a person in a second country ("beneficiary" or "recipient"), in the currency of that second country. The method uses banks in both countries and at least one payment agent in the second country to effect the transfer.

2. Description of the Related Art

FIGS. 1-3 show prior art methods for a remitter (sender) 102 in a first country ("sending country") to send funds to a beneficiary (recipient) 104 in a second country ("receiving country"). The sender pays in the currency of the first country ("sending currency") while the recipient receives funds in the currency of the second country ("receiving currency"). Thus, if the sender is in the U.S.A. and the recipient is in Mexico, the sender 102 pays in U.S. Dollars and the recipient 104 receives funds in Mexican Pesos.

FIG. 1 shows a first prior art "sender-bank-account to recipient-bank-account" transfer model. The sender 102 banks at a first bank 110 ("sending bank") located in the first country where he or she has a bank account 112. The recipient 104 banks at a second bank 120 ("receiving bank") in the second country where he or she has a bank account 122 where funds are in the second currency. In this instance, the second bank is an affiliate of the first bank.

The sender 102 sends instructions 114 to the first bank 110 to transfer funds from his or her account 112 to the recipient's account 122 at the second bank 120. The instructions include information sufficient to identify the sender's bank account 112, the amount to be transferred (in either the sending currency or the receiving currency), and information sufficient to identify the recipient's bank account 122. The sender 102 may also inform the recipient 104 via another channel 116, such as by a telephone call or an e-mail, that a fund transfer to the recipient's bank account 122 is being made, when the funds should be available in the recipient's bank account 122, and the amount being transferred.

The instructions 114 may be provided by the recipient to the sending bank 110 in one of a number of different ways. For example, the instructions 114 may be provided over the telephone to a human operator ("associate") who converses with the sender to determine the details of the transaction. The instructions may instead be provided over the telephone to an automated system which responds to either voice commands by using voice recognition, or to numeric commands from the telephone keypad, or both. The instructions 114 may instead be provided over the internet, for instance after the sender has logged in to the sending bank's secure web site and entered the required information. Other methods of receiving the instructions 114 are also possible.

Once the sending bank 110 receives the instructions, it checks to see whether there are sufficient funds in the sender's bank account 112. Assuming sufficient funds are present in the sender's bank account 112, the sending bank 110 performs a foreign exchange fund transfer 118 to the recipient's account 122. In this prior art embodiment, since the sending bank 110 and the receiving bank 120 are affiliated with one another, such a transfer can be done through internal systems, without using 3rd party banks, interbank wire transfers, "SWIFT" codes, and the like. Eventually, the recipient 104 may make a withdrawal 144 from his or her own account 122, once the transfer has been completed.

FIG. 2 shows a second prior art "sender-bank-account to recipient-bank-account" transfer model. The prior art model of FIG. 2 differs from the prior art model of FIG. 1 primarily in that the second bank 220 is a $3^{rd}$ party bank which is unaffiliated with the sending bank 110. As a consequence, the instructions 214 provided by the sender 102 may be more detailed, giving additional information about the receiving bank 220, such as a SWIFT code. In this instance, the sending bank 110 typically makes a wire transfer 218 through open banking channels, specifying needed routing information, among other things. In addition, the sending bank 110 and the receiving bank 220 will use posted, current foreign exchange rates to determine the cost to the sender to have a specific sum in the receiving currency deposited in the recipient's bank account 222.

FIG. 3 shows a prior art "Western Union®" model for a sender 102 to provide cash to a recipient 104. In this model, agents are used in both the sending country and in the receiving country. The sender 102 visits the office of a collecting agent 302 and completes a form to send money. Among other things, the form asks for contact information about the recipient—name, address, telephone number, etc. The sender 102 then presents the completed form, the amount to be sent plus a transaction fee (all in the currency of the sending country), along with one or more forms of personal identification, such as a driver's license. A test question devised by the sender 102 may also be submitted, along with an answer, for use in confirming the identity of the recipient when payment is made at the other end. The collecting agent 302 gives the sender a receipt with an accompanying Money Transfer Control Number (MTCN), which serves as a tracking number. Thus, in the prior art model of FIG. 3, the sender 102 and the collecting agent 302 must exchange information, as depicted by arrows 314.

The collecting agent 302 then provides the relevant information 306 to a money transfer company 310, such as a Western Union®. The money transfer company uses various channels, shown generally as 318, to send instructions and funds to one of its payment agents 334 in the receiving country. These instructions typically include information sufficient to contact the recipient 104 and authenticate the recipient. Contact information may be as simple as a name, address and phone number, while the authentication information may include the aforementioned test question and/or MTCN number. The sender 102, via another channel 316, typically phone or e-mail, can send needed information about the transaction to the recipient 104.

The beneficiary obtains the cash either by going and picking it up from the payment agent 334, or having it delivered. In either case, the recipient 104 requires authentication information, such as a valid form of identification and, if applicable, the answer to the test question provided by the sender 102. The recipient 104 may also provide the MTCN to the payment agent 334 to identify the transaction. Thus, as seen in FIG. 3, the payment agent 334 provides the recipient 104 with cash, upon receiving the appropriate authentication information, as indicated by arrows 344.

The prior art bank-to-bank models seen in FIGS. 1 and 2 cannot be used when the recipient 104 does not have a bank account. Thus, inter-country fund transfers using these models do not work for millions of potential recipients throughout the world, especially in regions throughout Central and South America, and also in Asia and Africa, where millions do not have bank accounts.

The prior art "Western Union®" model seen in FIG. 3 typically requires that a sender 102 go in person to provide the funds to the collecting agent 302. This is an inconvenience, since senders 102 do not typically have accounts with collecting agents against which they may draw funds for such inter-country money transfers.

SUMMARY OF THE INVENTION

In one aspect, the present invention is directed to a method for a banking customer of a first bank in a first country to invoke a banking service of sending cash to a recipient in a second country, the cash being in the currency of the second country, the banking customer having a bank account in the first bank. The inventive method comprises designating a recipient of the cash; specifying a first amount of funds to be provided to the recipient; allowing the first bank to debit the banking customer's bank account for a second amount of funds; and allowing the first bank to send payment instructions to a second bank in the second country, the payment instructions comprising information sufficient for the second bank to provide said cash to the recipient via a payment agent in the second country.

In another aspect, the present invention is directed to a method for a first bank in a first country to provide a banking customer with a banking service of sending cash to a recipient in a second country, the cash being provided in the currency of the second country, the banking customer having a bank account in the first bank. The inventive method comprises receiving from the customer, information sufficient to identify the recipient; receiving from the customer, a first amount that the customer wishes to have sent, in cash, to the recipient; debiting the bank account of the customer by a second amount; crediting a commingled account belonging to a second bank with a third amount, the second bank being in a second country; and sending payment instructions to the second bank, the payment instructions comprising information sufficient for the second bank to provide said cash to the recipient via a payment agent in the second country.

In yet another aspect, the present invention is directed to a method for a second bank in a second country to provide cash to a recipient within said second country, the cash being provided in the currency of the second country. The inventive method comprises: receiving, by said second bank, first payment instructions from a first bank located in a first country, the first payment instructions identifying the recipient and a first amount of funds to be provided in cash to the recipient; receiving, into a commingled account belonging to said second bank, said first amount of funds from a first bank located in a first country, the first bank being affiliated with the second bank; and sending second payment instructions to a payment agent in the second country, the second payment instructions being at least partially derived from the first payment instructions, and directing the payment agent to provide said first amount of funds, in cash, to said recipient.

In yet another aspect, the present invention is directed to a cash remittance system that uses a first bank in a first country and a second bank in a second country, the second bank being an affiliate of the first bank, wherein the first bank provides a banking service to its banking customers whereby a banking customer can have funds from his or her bank account delivered, in cash, to a recipient in the second country, via a commingled account belonging to the second bank and with the assistance of a third party payment agent in the second country, the cash being in the currency of the second country. The inventive cash remittance system further comprises a first bank computer having a transaction database associated therewith, and configured to transfer funds from a banking customer's bank account to the commingled account belonging to the affiliated second bank, and further configured to send payment instructions to the second bank, the payment instructions comprising information sufficient for the second bank to provide said cash to the recipient via a payment agent in the second country.

BRIEF DESCRIPTION OF THE DRAWINGS

FIGS. 5a-5d depict the principal roles of each of the various parties in the inter-country fund transfer protocol of FIG. 4.

FIGS. 7a and 7b depict exemplary contents of first payment instructions and second payment instructions, respectively.

DETAILED DESCRIPTION

Figure 4:
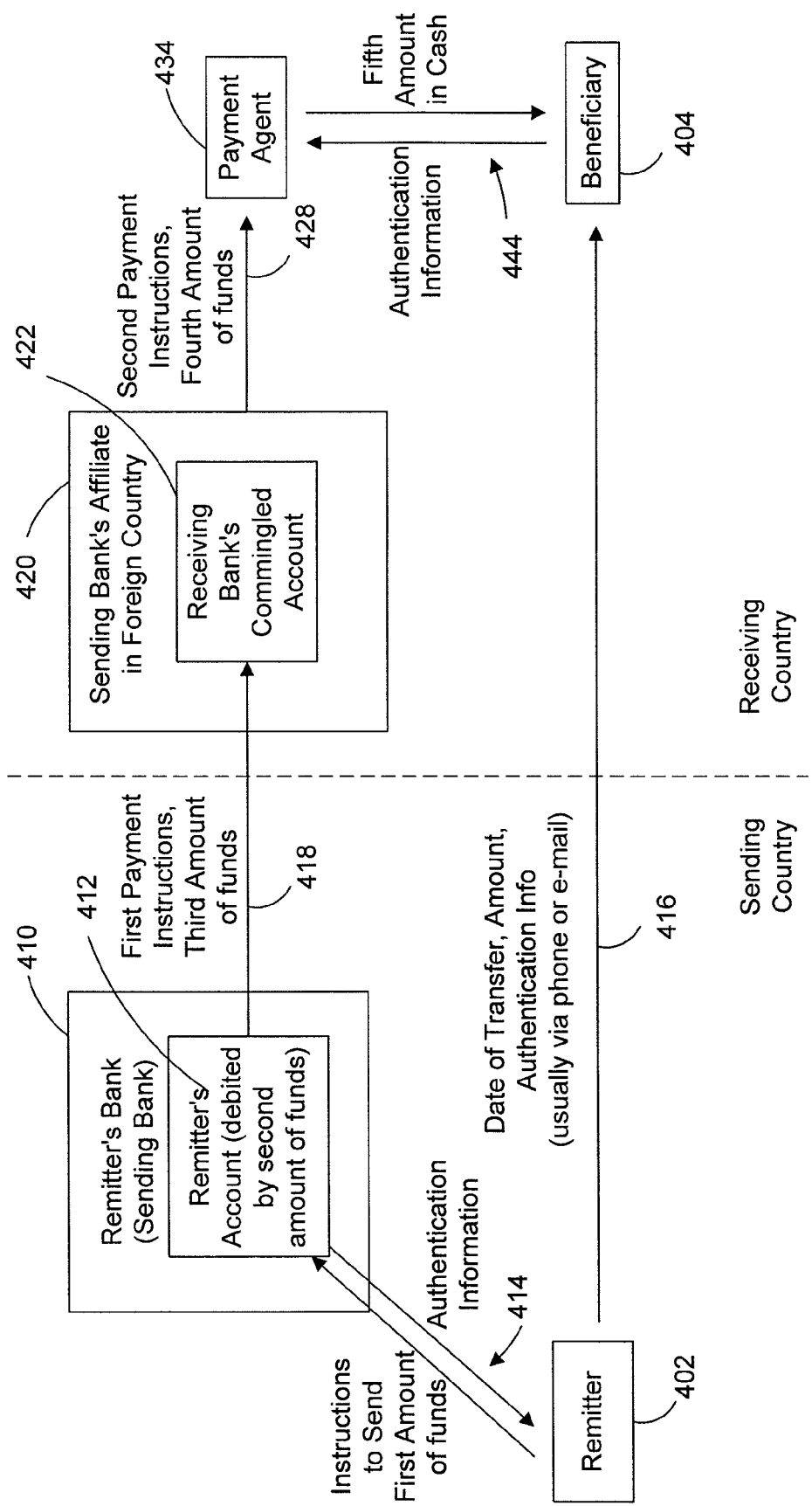
FIG. 4 shows an inter-country fund transfer protocol in accordance with the present invention.
Figure 6A:
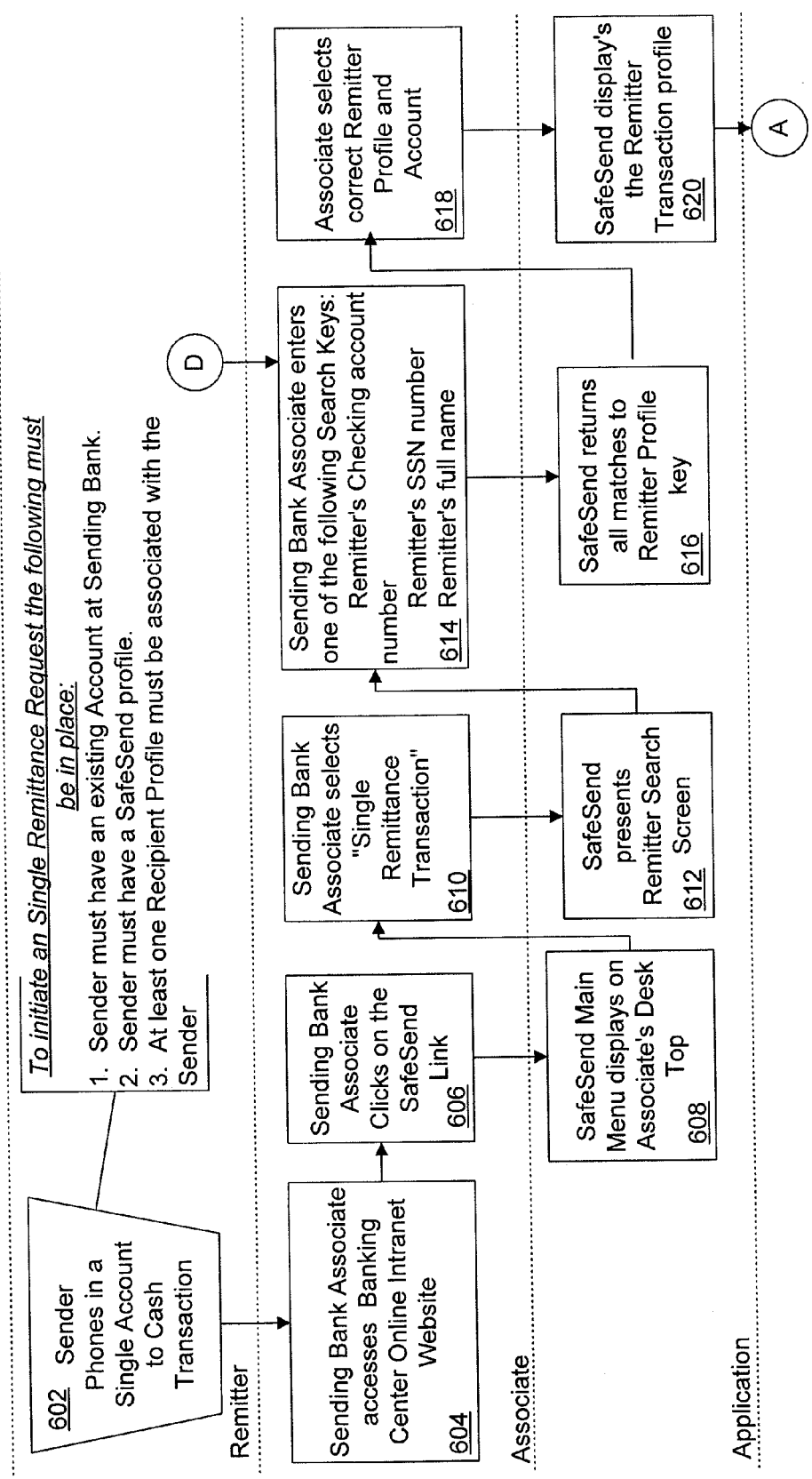
FIGS. 6a-6e depict a flow chart of an application used to help implement an inter-country fund transfer protocol in accordance with the present invention.
Figure 6B:
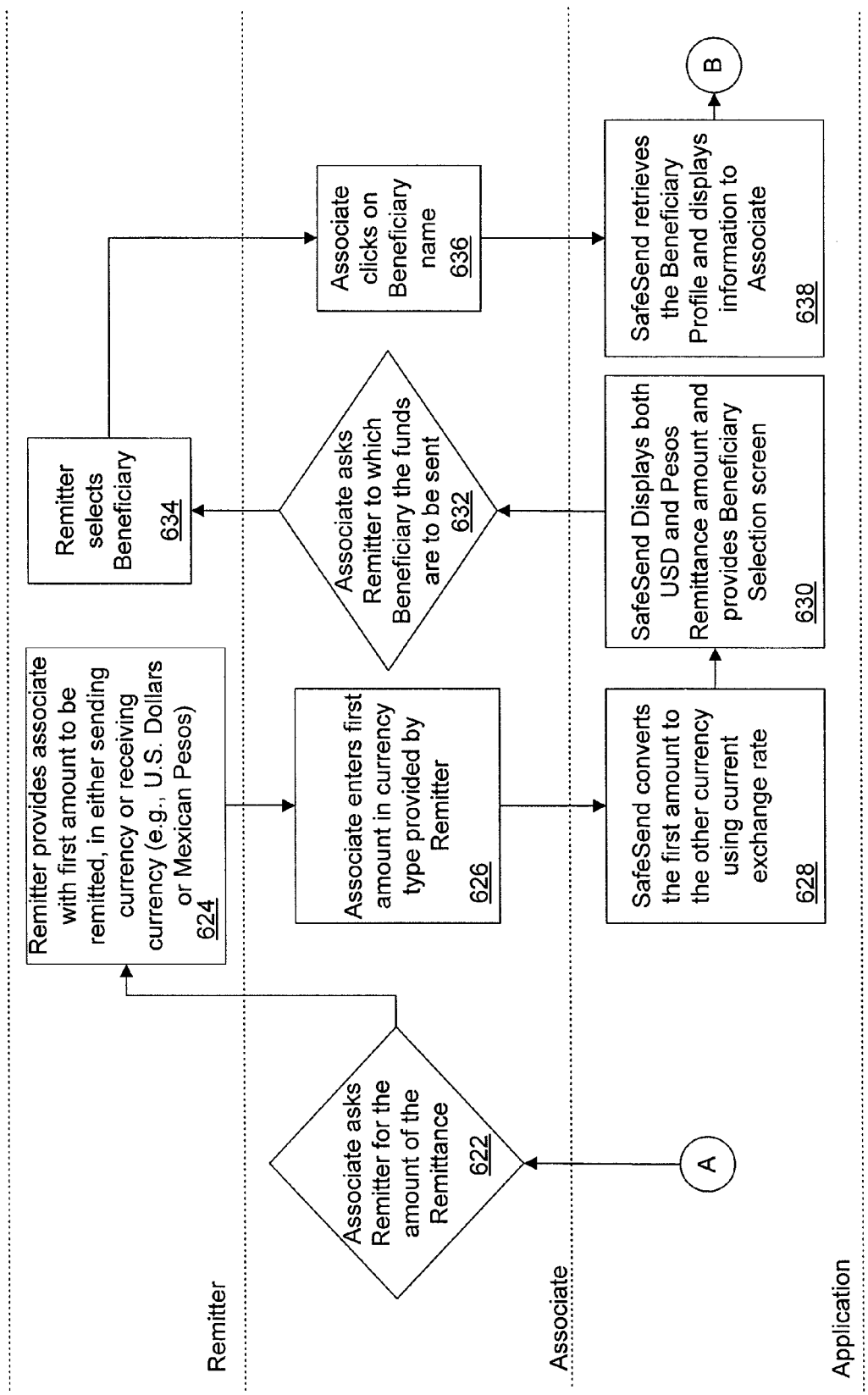
Figure 6C:
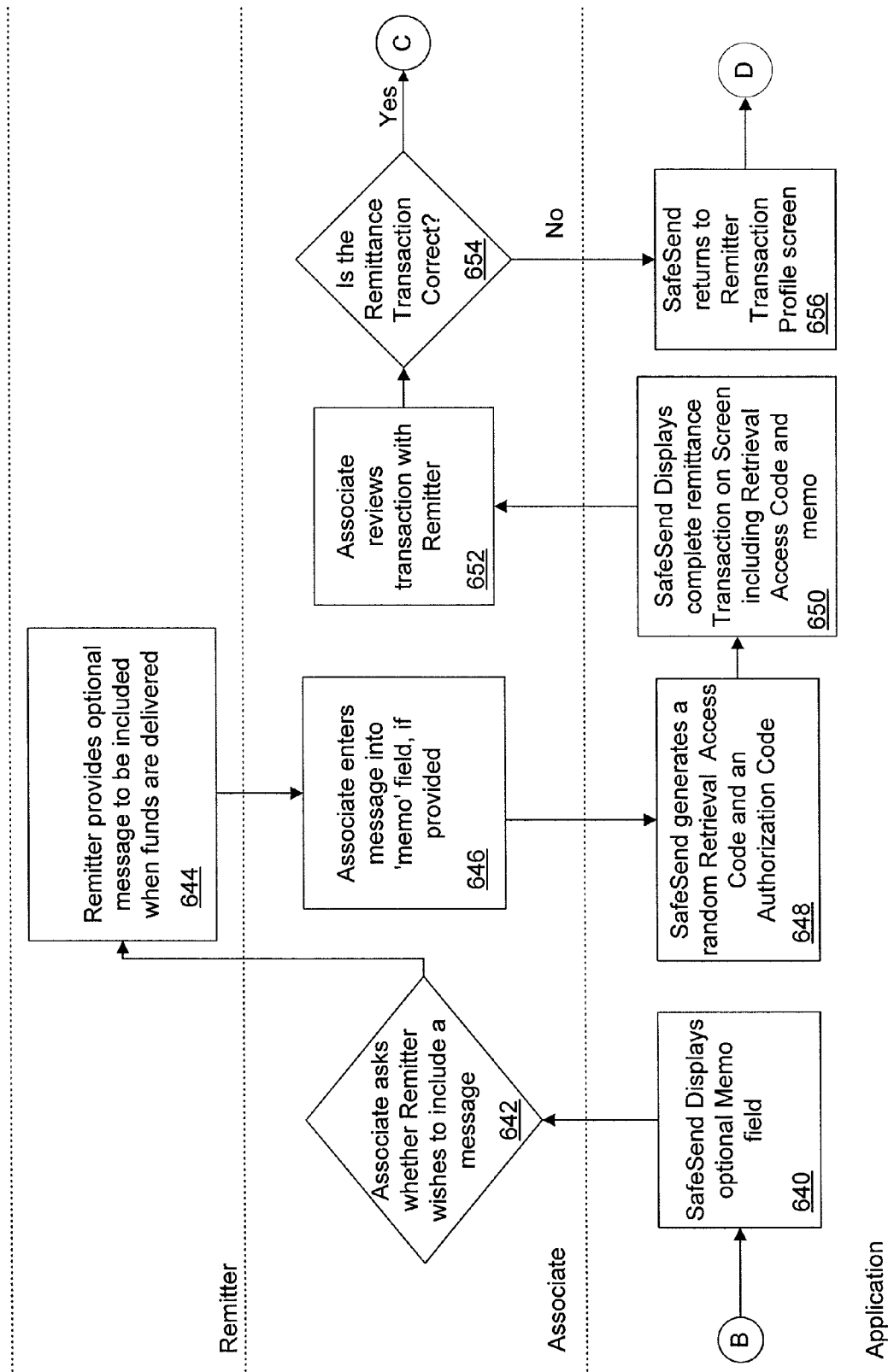
Figure 6D:
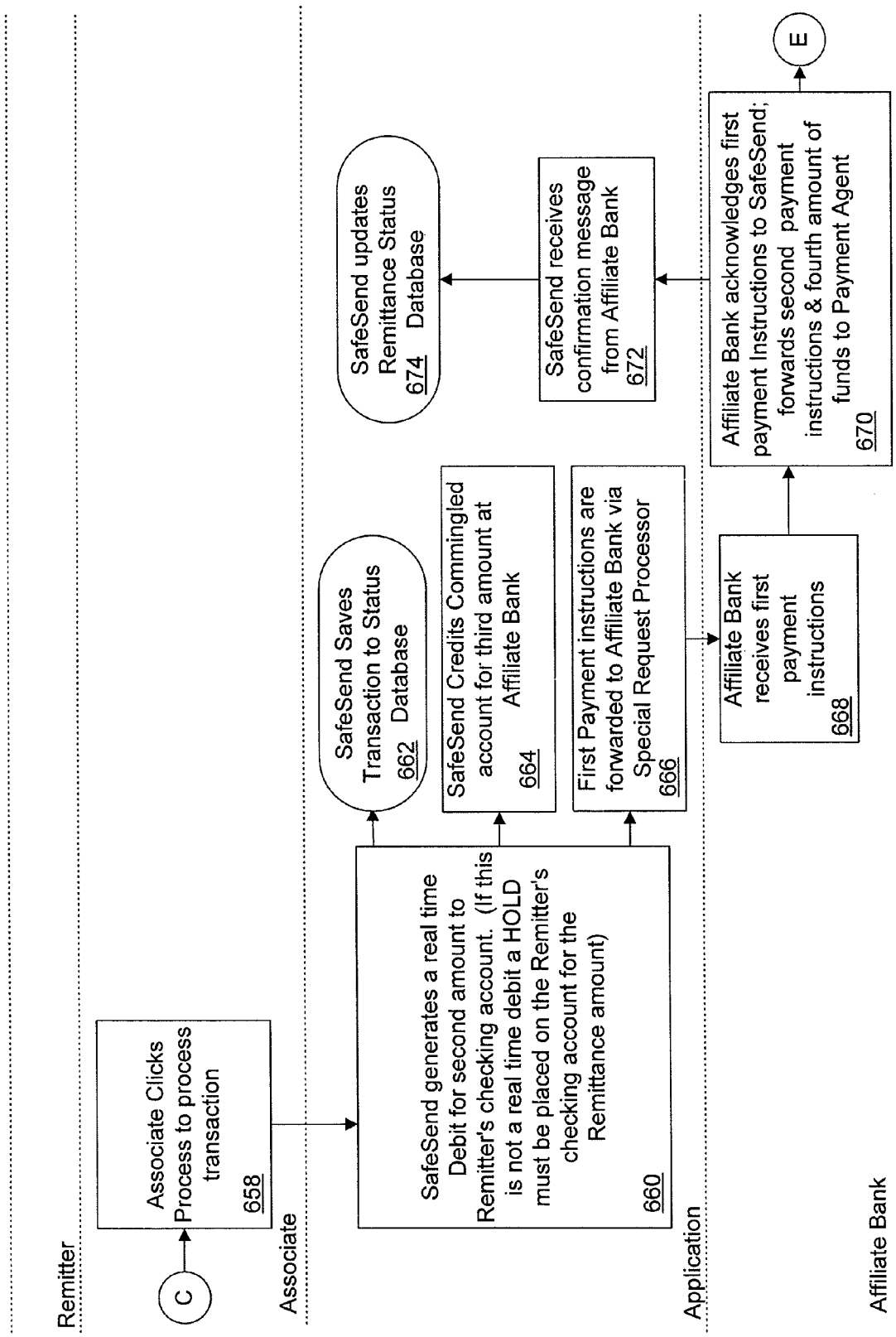
Figure 6E:
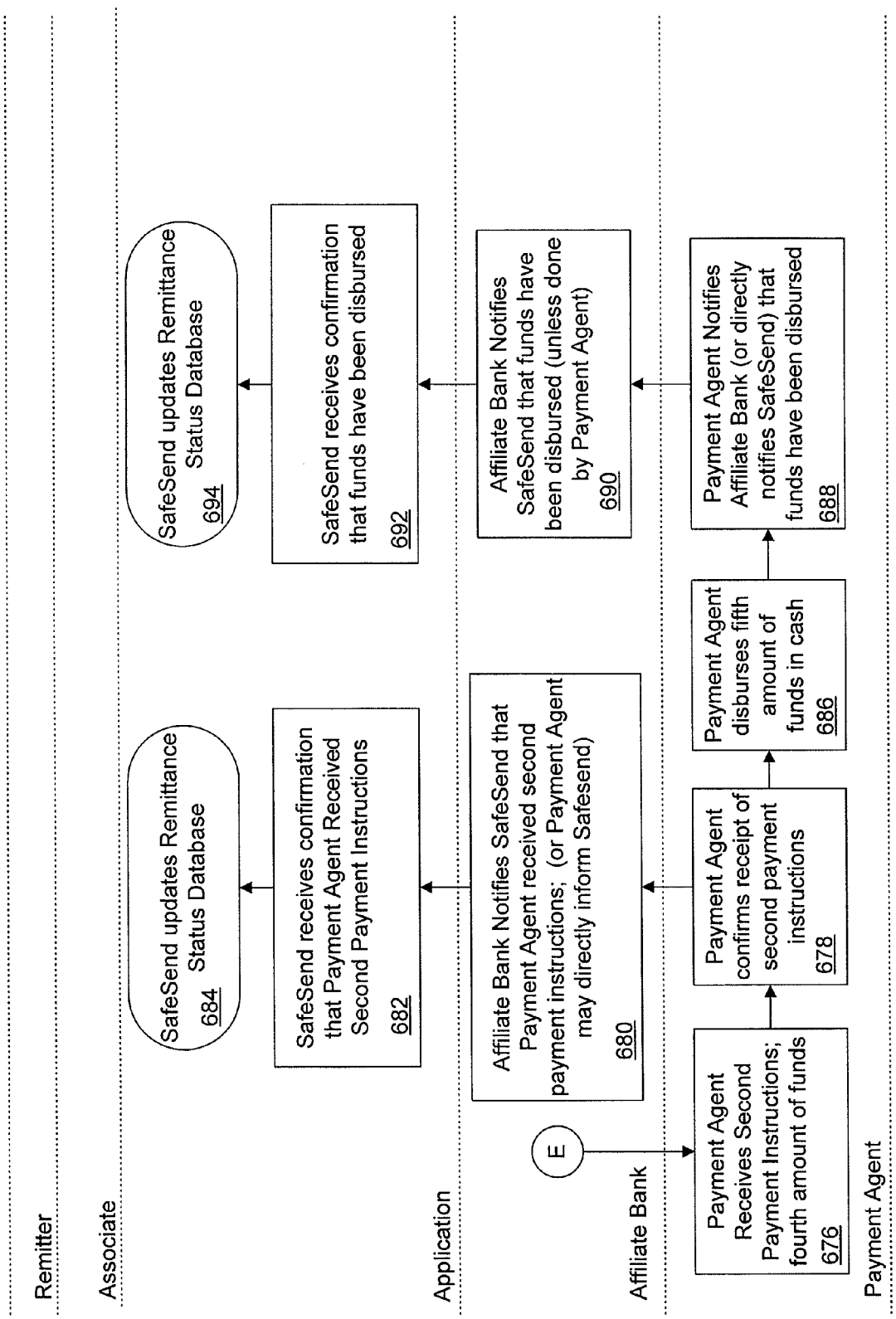

FIG. 4 shows the protocol for a sender 402 in a first country to cause a first amount of cash to be provided to a recipient 404 in a second country.

The sender 402 has an account 412 at a sending bank 410, and the sending bank 410 has an affiliated bank 420 ("receiving bank") in the receiving country. The sending bank 410 provides a banking service to its banking customers 402 whereby a banking customer can have funds from his or her bank account 412 delivered, in cash, to a recipient 404 in another country, via a commingled bank account 422 belonging to the receiving bank 420 and with the assistance of a 3rd party payment agent 434 in the second country. The bank account 422 is considered to be "commingled" in the sense that funds originating from the bank accounts 412 of many different senders end up in the same account 422, albeit each for a limited time until the funds are sent on to the payment agent 434.

Funds in the banking customer's account 412 are in the currency of the sending country ("sending currency") in which the bank 410 is situated. Meanwhile, the cash provided to the recipient 404 is in the currency of the second country ("receiving currency"). In those instances where the U.S. is the sending country, and the receiving country recognizes the U.S. Dollar as its official currency, then the terms "sending currency", "currency of the first country", "receiving currency" and "currency of the second country" all refer to the U.S. Dollar, and so refer to the same thing. And in a "second" country which recognizes the U.S. Dollar as an official currency in addition to its own native currency, the terms "receiving currency" and "currency of the second country", within the meaning of the present application, refer to both currencies. Therefore, the terms "receiving currency" and "currency of the second country" refer to any and all currencies that are officially recognized in that second country.

Figure 1:
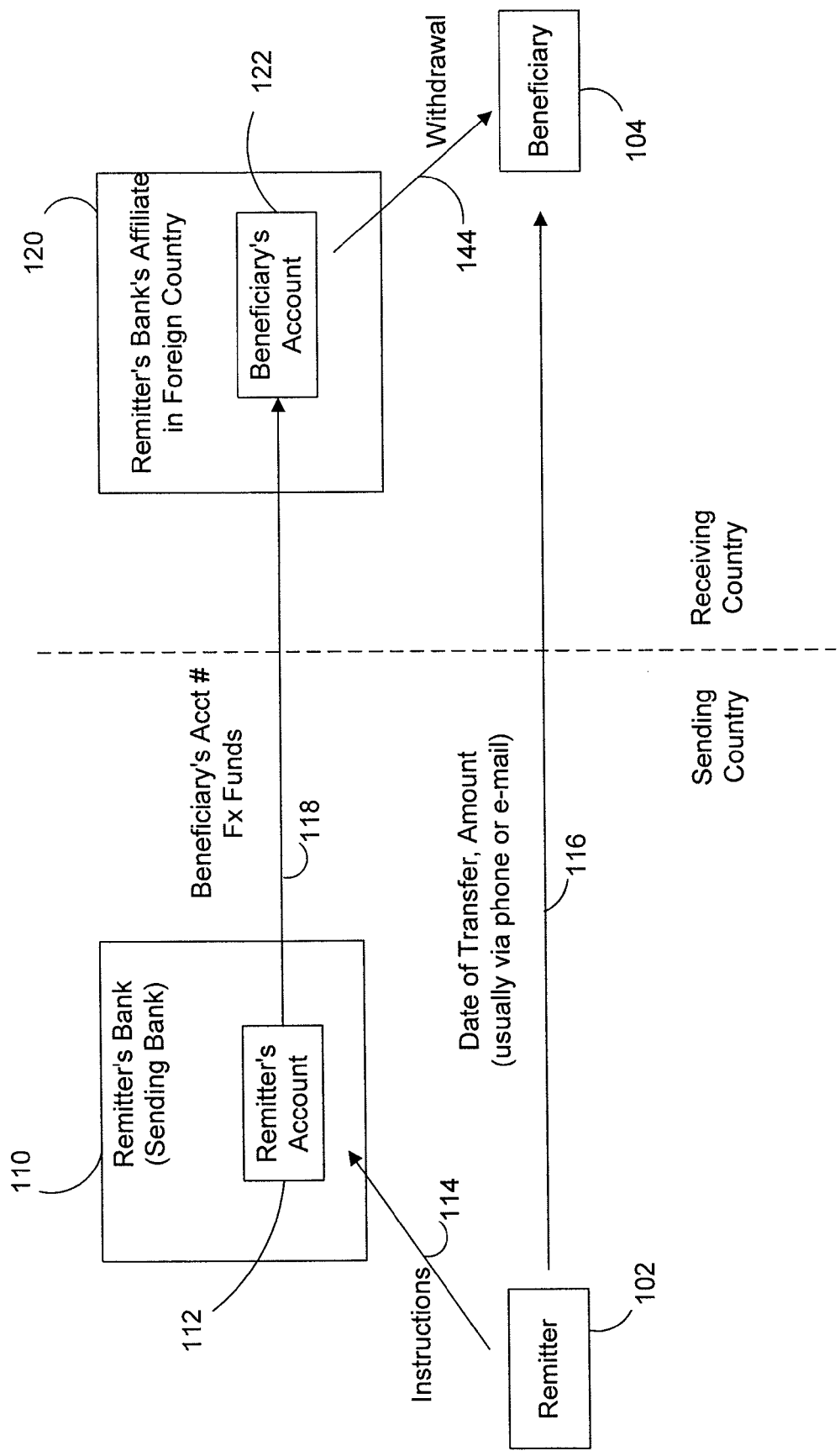
FIG. 1 shows a prior art inter-country fund transfer protocol in which money is transferred from a first bank account in one country to a second bank account in an affiliated bank in a second country.
Figure 2:
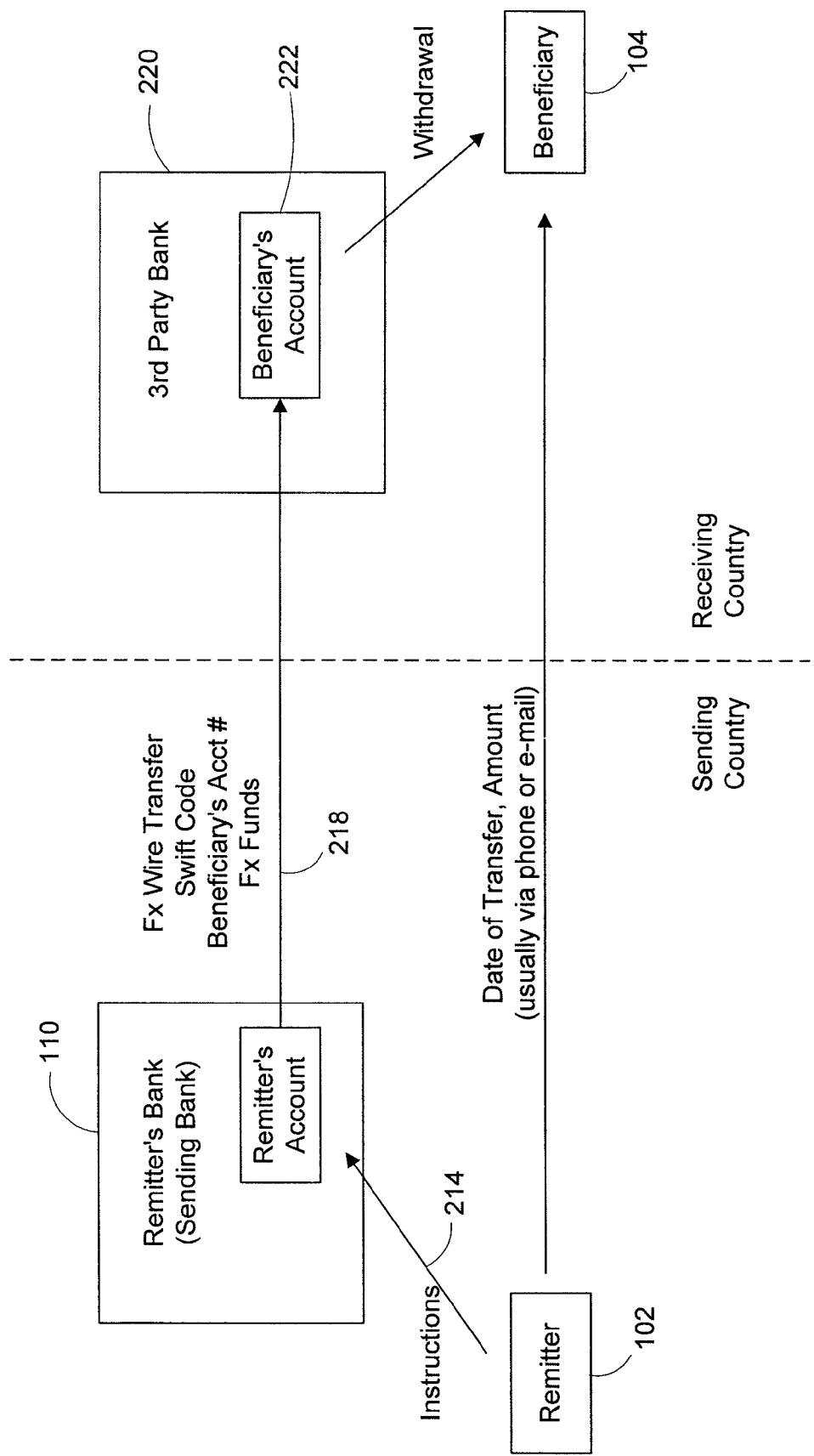
FIG. 2 shows a prior art inter-country fund transfer protocol in which money is transferred from a first bank account in one country to a second bank account in an unaffiliated bank in a second country.
Figure 3:
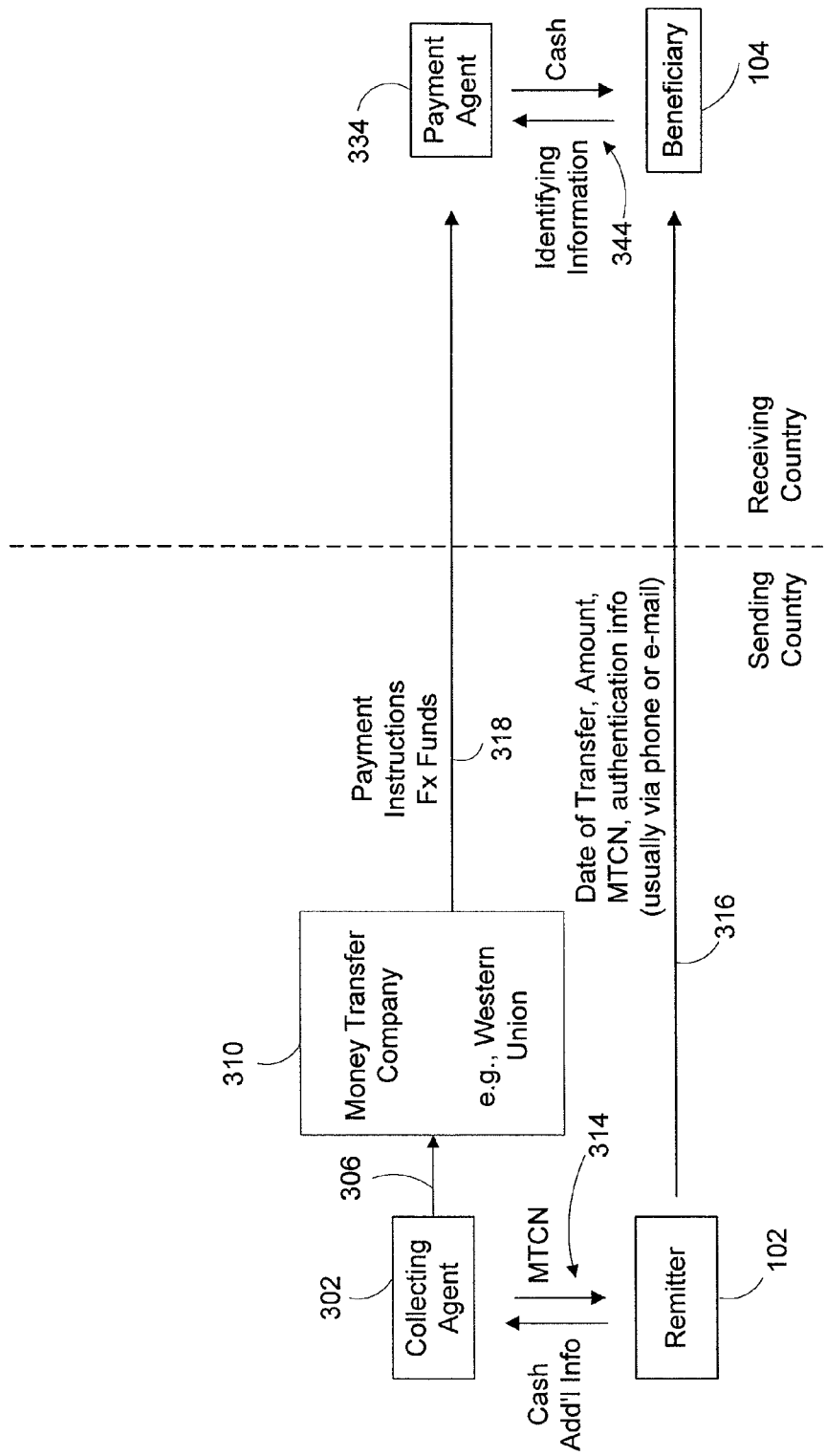
FIG. 3 shows a prior art inter-country fund transfer protocol using a collecting agent in a sending country, a money transfer company, and a payment agent in a receiving country.

The sender 402 provides instructions to the sending bank 410 and the sending bank 410 provides authentication information to the sender, as shown generally by arrows 414. The instructions may be provided over the phone or via the internet, as discussed above with respect to the prior art embodiment of FIGS. 1 and 2. The instructions effectively direct that a first amount of cash be sent to a designated beneficiary 404 in a second country, the cash being provided in the second currency, and that a second amount of funds be taken from the sender's account 412 to pay for this. The authentication information, along with other information such as the date and the first amount of cash being sent, may be conveyed by the sender 402 to the recipient 404 via another channel 416, such as telephone or e-mail.

The bank 410 formats the user-provided payment instructions into first payment instructions, and uses internal banking channels 418 to send the first payment instructions and transfer a third amount of funds into a commingled account 422 belonging to the affiliated bank 420. The commingled account 422 is used to provide the funds distributed as cash to the recipients. The funds in this commingled account 422 may be either in the sending currency or in the receiving currency.

The commingled account 422 may reside in the receiving bank 420 in the receiving country, as shown in FIG. 4. Alternatively, it may reside in a branch of the receiving bank, which branch happens to be located in the sending country. Still alternatively, the commingled account 422 may reside in another bank, either affiliated or not, in the sending country.

The receiving bank 420 reformats the first payment instructions into second payment instructions which are compatible with the electronic systems of the payment agent 434. The receiving bank 420 then forwards the second payment instructions to the payment agent via a channel shown generally as 428.

A fourth amount of funds in the receiving currency is then sent to the payment agent 434. In one embodiment, the fourth amount of funds is sent by either an intra-bank, or interbank, transfer to an account of the payment agent 434. Alternatively, cash may be provided to the payment agent 434, such as via courier. Still alternatively, the fourth amounts of funds may be routed to the payment agent 434 via intermediate payment agents (not shown). Regardless of how this fourth amount of funds reaches the payment agent 434, the payment agent 434 is charged with disbursing a fifth amount of funds, in cash, to the recipient 404, the fifth amount having the same value as the first amount originally specified by the sender 402.

In one embodiment, the first amount of funds specified by the sender 402 as the amount to be sent in cash to the recipient has the same value as the second amount of funds debited from the sender's account 412; the third amount of funds deposited in the commingled account 422 has the same value as the second amount of funds (though possibly in a different currency); the fourth amount of funds delivered to the payment agent 434 has the same value as the third amount of funds received into the commingled account 422 (though again possibly in a different currency); and the fifth amount of funds provided to the recipient 404 in cash has the same value as the first, second, third and fourth amounts.

In other words, in this embodiment, no fees or commissions are charged to either the sender 402 or the recipient 404; it is a free service provided to a customer/sender of the sending bank (subject to the current foreign exchange rate for converting from the sending currency to the receiving currency, if necessary). By providing such a free service, the sending bank may attract new customers who have foreign cash remittance needs, some of these new customers thus being encouraged to open a bank account for the first time.

In other embodiments, fees or commissions may be charged to either the sender or the recipient. For instance, the second amount debited to the sender's account may be slightly more than the first amount specified by the sender, this excess being partially or wholly included in the third and fourth amounts, so as to compensate the payment agent 404. Other fees and commissions may be introduced, as well.

The payment agent 434 ultimately provides cash to the recipient 404. This is normally accomplished by the recipient 404 going and picking up the cash from the payment agent 434, although it is possible in some scenarios that the payment agent 434 delivers the cash to the recipient 404. In some embodiments, the sender 402 can designate in the instructions which of these is to take place. In either case, however, the recipient 404 requires some authentication information to establish that he or she is entitled to receive the cash. Thus, as seen in FIG. 4, the payment agent 434 provides the recipient 404 with cash, upon receiving the appropriate authentication information, as indicated by arrows 444.

FIGS. 5a-5d show the responsibilities and primary actions of the principal entities involved in the fund transfer protocol of the present invention.

FIG. 5a corresponds to the sender 402. As a threshold matter, as seen in box 512, the sender must be a customer of the sending bank. Therefore, the sender must either open a bank account or designate an existing bank account to be used for international transfers. The bank account 412 preferably is a checking account, although other types of accounts, such as savings accounts, may be used instead. In general, any kind of demand deposit account may be used. In other embodiments, a line of credit, such as one established by a home equity loan, may serve as the sender's account.

As indicated in box 514, the sender 402 must then link this bank account 412 to at least one potential recipient. This is done by having the sender create an electronic list of recipients, which comprises one electronic record or recipient profile for each potential recipient to whom the sender may wish to send funds. For each potential recipient, the sender is asked to provide recipient information. The recipient information is entered into designated fields of an electronic record which is then added to the list of potential recipients. The list of potential recipients may be edited by the sender, thereby permitting the sender to selectively add or delete potential recipients, or modify/update the recipient information of a particular potential recipient.

The recipient information typically includes the recipient's name and address, telephone number, date of birth, recipient's preference for how funds are to be distributed and perhaps other identifying or tracking information, as well. The sender 402 may also designate which payment agent is to be used with each potential recipient. The sender may determine this based on the location of the potential recipients since certain payment agents may only serve a particular geographical area.

At some later time, as seen in box 516, the sender 402 contacts the sending bank 410 and provides instructions to send a first amount of funds to a particular recipient on the recipient list. The recipient information in the corresponding electronic record is used to populate payment information data, thereby obviating the need for the sender to provide complete detailed information about the selected recipient, each time funds are to be sent. Upon receiving these instructions, the sending bank 412 provides authentication information to the sender.

Later on, as indicated by box 518, the sender 402 provides the recipient 404 with information about the funds that are being sent, along with authentication information useful in establishing the recipient's right to receive the funds.

FIG. 5b corresponds to the sending bank 410. As seen in box 522, the sending bank 410 receives instructions from the sender 402 to send a first amount of cash to a designated recipient 404 in another country, and authorization from that sender to debit sender's account for a second amount. This second amount preferably is the same as the first amount, but need not be so if the sending bank charges a fee or commission. In box 524, the sending bank 410 debits the sender's account for the second amount, and in box 526 it formats first payment instructions. The first payment instructions include all of the information that the various payment agents 434 might require, along with special information for use only by the receiving bank 420, among other information. All of this is formatted in a manner understandable to the electronic systems used by the receiving bank.

As indicated by box 528, the sending bank 410 sends the first payment instructions to the receiving bank 420, and transfers a third amount of funds to the commingled account 422, which belongs to the receiving bank 420. This third amount of funds preferably has the same value as the second amount of funds and also the first amount. The commingled account 422 may contain funds in either the sending currency or the receiving currency. The commingled account 422 is used to receive the funds which later are supplied to the payment agent 434 for distribution as cash to the recipient 404.

FIG. 5c corresponds to the receiving bank 420. As seen in box 532, the receiving bank 420 receives the first payment instructions from the sending bank. A third amount of funds are also deposited in the commingled account 422. As also seen in box 534, the receiving bank then formats second payment instructions based at least in part on the first payment instructions. The second payment instructions are formatted in a manner understandable to the application software and/or other electronic systems used by the selected payment agent 404, it being understood that different payment agents may require different formats, and possibly even different types of information.

As indicated in box 536, the receiving bank 420 sends the second payment instructions to the selected payment agent 404, along with the fourth amount of funds. The fourth amount of funds may be transferred to the payment agent electronically, such as to an account of the payment agent, by courier in the form of cash, or by other accepted and known methods. As indicated in box 538, the sending bank 420 may await confirmation from the payment agent 434 that the cash has been delivered to the recipient 404, and may report this to the sending bank 410.

FIG. 5d corresponds to the payment agent 434. As seen in box 542, the payment agent 434 receives the second payment instructions and acknowledges receipt to the receiving bank 420. As seen in box 544, in one embodiment, the payment agent may contact the recipient 404. This may be done by phone, e-mail or other suitable means, and in certain geographical areas, the payment agent may even know the recipient personally. In other embodiments, it is up to the recipient 404 to contact the payment agent and inquire after such matters as whether the cash is available, when it will be delivered, when might it be picked up, etc. Regardless of whether the payment agent 434 is to deliver the cash, or the recipient 404 is to pick up the cash, the payment agent 434 is responsible for ensuring that the funds are disbursed in accordance with the second payment instructions. Finally, after the fifth amount of funds has been disbursed to the recipient 404 in cash, the payment agent 434 notifies the receiving bank 420 and/or the sending bank 410 that the cash has been provided to the recipient 404.

A working embodiment of the present invention is facilitated by a suite of software, known as "SAFESEND"™. This application includes a number of software modules which implement various facets of the overall system. These modules provide such functionality as establishing a sender profile, establishing a recipient profile, updating a profile, submitting a status inquiry to track a transaction, initiating a dispute and following up, and initiating a single remittance "account-to-cash" transaction.

The sending bank 410 and the receiving bank 420 each use one or more computer platforms to host the necessary software, databases and other information. These platforms may communicate with one another via dedicated lines or a network. The specific software modules residing on the computer platforms used by the two banks 410, 420 may differ due to the role played by each bank. It is understood, however, that in a reciprocal arrangement in which a given bank can play the role of either a sending bank, or a receiving bank, it will be provisioned with the complete suite of software.

FIGS. 6a-6e present a detailed information and data flow diagram comprising a number of steps illustrating the interaction among the various entities and a software application resident in the sending computer and used to facilitate a single remittance account-to-cash transaction ("single remittance application"). In this embodiment, without loss of generality, it is assumed that the sender is in the United States and wishes to have cash delivered to a recipient in Mexico. Thus, the sender will pay in U.S. Dollars and the recipient is to receive cash in Mexican Pesos.

In the embodiment seen in FIGS. 6a-6e, the sender ("remitter") telephones his or her instructions to a person working for the bank ("associate") to have cash sent to a particular recipient ("beneficiary"). Horizontal dotted lines in these figures indicate boundaries between the various entities: (1) remitter; (2) associate (representing the sending bank); (3) the single remittance application (also representing the sending bank); (4) receiving bank; and (5) payment agent.

In step 602, the sender places a phone call to the sending bank, to instruct the bank to have a first amount of cash sent to a particular recipient.

In step 604, the sending bank associate answering the call accesses the sending bank's internal online intranet website. In step 606, the associate clicks on the "SafeSend" link, which invokes the suite of software configured to handle the transaction. In step 608, the application's main menu is displayed on the associate's computer screen, and this menu includes the various software modules discussed above. In step 610, the associate clicks on the menu option for "single remittance transaction", which allows a sender to have cash delivered to a recipient.

In step 612, the single remittance application presents a remitter search screen, which asks for information to help identify the sender. In step 614, the associate enters one or more items of information to help identify the correct sender. For this, the associate selects from such items as the sender's checking account number, the sender's social security number, the sender's full name or others as may change from time to time. In step 616, the single remittance application returns all matches and displays these on the associate's computer screen. In step 618, after verification with the sender (who is still on the telephone), the associate selects the correct sender and in step 620, the single remittance application displays a sender transaction profile.

The sender transaction profile that is displayed may include a wide variety of information pertinent to the contemplated transaction. Thus, included in the sender transaction profile may be the sender's profile (name, address, phone number, date of birth, etc.), the sender's account information, including the funds available for a transfer (presented in both the sending currency and the receiving currency), the current foreign exchange rate, and names of at least some of the potential recipients, among other items. In addition to the information, the sender transaction profile may also have one or more fields for entering such things as the amount being transferred, the effective date of the transfer, when the transfer request should expire in case the payment agent could not reach the recipient, the payment agent preferred by the sender, and the like.

In step 622, the associate asks the sender how much the sender would like to send the recipient. In step 624, the sender provides the associate with a first amount that the sender wishes to have sent to the recipient. This first amount may be expressed by the sender either in the sending currency or the receiving currency (e.g., either in U.S. Dollars or Mexican Pesos). In step 626, the associate enters the first amount in the currency type provided by the sender, into an appropriate field in the sender transaction profile. Similarly, the associate may ask for, and then enter in a corresponding field, the effective date for the transfer, when the transfer request should expire, and possibly even the preferred payment agent. Default entries may be provided for one or more of these.

In step 628, the application converts the amount entered into the other currency using the current foreign exchange rate. In step 630, the single remittance application displays the amounts in both currencies and displays a list of potential recipients previously entered into the system by the sender. In step 632, the associate, upon viewing the display, asks the sender to designate the recipient to whom the funds are to be sent. For this, the associate may read the list of potential recipients to the sender. In step 634, the sender designates the recipient and in step 646 the associate clicks on the recipient's name. Thus, the recipient designated by the sender is selected from a list of potential recipients, the list of potential recipients having previously been assembled by the sender.

In step 638, the single remittance application retrieves the recipients profile and displays this on the associate's computer screen. In step 640, the single remittance application displays an optional 'memo' field and in step 642, the associate asks whether the sender wishes to include a message. In step 644, the sender may optionally provide the content for such a message and if such content is provided, in step 646, the associate enters the message into the 'memo' field.

In step 648, the single remittance application generates an authorization code and a random retrieval access code, which serves as a transaction/tracking number. In step 650, the single remittance application displays comprehensive information about the proposed remittance transaction, for verification purposes. In step 652, the associate reviews the proposed remittance transaction with the sender over the phone to confirm that everything is in accordance with the sender's wishes.

In step 654, the associate determines whether the proposed remittance transaction is correct. If there is an error in the proposed remittance transaction, then in step 656, the single remittance application goes back to the remitter transaction profile screen of box 620. If, on the other hand the proposed remittance is correct, then in step 658, the associate clicks a 'process' button on the display to process the transaction and control goes to box 660. It should be noted here that once the associate clicks the 'process' button in step 658, both the sender's role, and the associate's role in this transaction are over and both may hang up the phone; the transaction will continue without their further participation.

In step 660, the transaction is processed and the single remittance application generates a real time debit for a second amount ("debited amount") to the sender's account. If a real time debit is not possible, then a hold is placed on the sender's account for this debited amount. In a preferred embodiment, this second, debited amount is identical to the first amount that the sender indicated to the associate that he or she wished to send. In other words, in this preferred embodiment, the sender's account is debited for the exact amount that the recipient is to receive, and so the sender is not charged a fee or commission for having cash provided to the recipient. It should be noted that in other embodiments, a fee or commission may be charged and so the second amount may be slightly higher than the first amount, the difference constituting a fee charged to the sender.

In step 662, the single remittance application saves the transaction information in a status database. The transaction information may include the retrieval access code, the time and date of the transaction, the sender's account number, recipient information, the amount debited, the payment agent selected, and the like.

In step 664, the single remittance application credits the commingled account 422 at the receiving bank 420 with a third amount ("credited amount"). In a preferred embodiment, the credited amount is the same as the debited amount, and so the exact amount of funds taken from the sender's account are then deposited into the commingled account 422.

In one embodiment, the commingled account 422 holds funds in the sending currency. In the case of a U.S.-based sender, this means that the 'debited amount' is taken from the sender's account 410 (in U.S. dollars) and deposited in the commingled account 422 as the 'credited amount'. The receiving bank 420 then takes those 'Y' U.S. dollars in the commingled account 422 and uses them to purchase Mexican Pesos using the current foreign exchange rate. In another embodiment, the commingled account 422 holds funds in the receiving currency. In such case, the sending bank again takes the 'debited amount' from the sender's account, but this time first converts it into Mexican Pesos at the current foreign exchange rate, and then deposits the Pesos into the commingled account 422, as the 'credited amount'. Regardless of which bank converts the funds from U.S. dollars to Mexican Pesos, the receiving bank 420 sends a fourth amount ("transferred amount"), in Mexican Pesos, to the payment agent 434, as discussed further below.

In step 666, the single remittance application creates first payment instructions 700 in a predetermined format. As discussed further below with respect to FIG. 7a, the first payment instructions include all of the information that the various payment agents 434 might require, along with special information for use only by the receiving bank 420, among other information, all formatted in a manner understandable to the electronic systems used by the receiving bank. Also in step 666, the single remittance application sends first payment instructions to the receiving bank via a special request processor. It can now be seen that by reviewing and approving the proposed remittance transaction in step 652, the sender 402 allows the sending bank to both debit the sender's bank account 412 and also send the first payment instructions to the receiving bank 420.

In step 668, an instruction receiving application associated with the receiving bank 420 receives the first payment instructions.

In step 670, the instruction receiving application acknowledges the first payment instructions to the single remittance application. Taking into account which payment agent has been selected by the sender, the receiving bank 420 reformats some of the content in the first payment instructions 700 into second payment instructions 730, discussed further below with respect to FIG. 7b. The second payment instructions are then sent by the receiving bank to the payment agent 434. The receiving bank may also provide the fourth amount of funds to the payment agent 434 at this time.

In those embodiments where the receiving bank is to select the payment agent, in step 670, a second application associated with the receiving bank 420 selects a payment agent based on one or more predetermined factors, such as the geographical location of the recipient.

In step 672, the single remittance application receives a confirmation message from the receiving bank that the first payment instructions have been received, and in step 674 the single remittance application updates a database with information on the status of the transaction.

In step 676, the payment agent 434 receives the second payment instructions; the payment agent may also receive the second funds. In step 678, the payment agent 434 confirms receipt of the second payment instructions. In one embodiment, this confirmation typically goes to the receiving bank 420. In other embodiments, this confirmation may go directly to the single remittance application in addition to the receiving bank. In step 680, the receiving bank notifies the single remittance application (unless this has already been done by the payment agent).

In step 682, the single remittance application receives confirmation that the payment agent received the second payment instructions and in step 684, the single remittance application updates the remittance status database accordingly.

In step 686, the payment agent 434 disburses the fifth amount of funds to the recipient 404 in cash, in accordance with the second payment instructions. In step 688, in one embodiment, the payment agent 434 notifies the receiving bank 420 that the cash has been disbursed to the recipient 404. In another embodiment, in step 688, the payment agent 434 directly notifies the single remittance application, as well as the receiving bank 420, that the funds have been disbursed. It is understood that if the funds have not yet been disbursed after some length of time, the payment agent will inform the receiving bank and also the single remittance application in some embodiments) that the disbursement is pending payment, canceled or expired, as the case may be, and any such status will be reflected in the remittance status database.

In step 690, the receiving bank 420 notifies the single remittance application that the payment agent 434 has disbursed the fifth amount of funds to the recipient 404 in cash. In step 692 the single remittance application receives confirmation that the funds have been disbursed. This confirmation comes either from the receiving bank 420 or directly from the payment agent. And in step 694, the single remittance application updates the remittance status database to reflect that funds have been disbursed and that the transaction has been completed.

In the embodiment described with respect to FIGS. 6a-6e, a telephone/associate model was used for the sender to provide instructions to the sending bank. It should be evident to those skilled in the art that the sender may instead use an automated telephone system which responds to either voice commands by using voice recognition, or to numeric commands from the telephone keypad, or both. It should also be evident that the sender may instead interact with a web-based tool and provide the same instructions. In this latter case, the sender would log in to a secure web site, specify the account, and the amount to be transferred and the beneficiary, among other things. In such case, the single remittance software application would effectively perform the role of the associate in addition to the role it plays in FIGS. 6a-6e.

FIG. 7a shows the contents of exemplary first payment instructions 700 of the sort created by the sending bank 410 and sent to the receiving bank 420, and FIG. 7b shows the contents of exemplary second payment instructions 730 of the sort created by the receiving bank 420 and sent to a payment agent 434. It is understood that the first payment instructions and the second payment instructions each are electronic records comprising a number of fields populated with information pertinent to the transaction. These two electronic records are typically in different formats and have overlapping, though not necessarily identical, information.

The first payment instructions 700 include a first set of fields that identify the transaction. These include the transaction routing number 702, the retrieval access code 704, and the date 706 and time 708 the record was created. The first payment instructions include a second set of fields that present details of the transaction. These include the date/time that the transaction request expires 709, the amount 710 that the recipient is to receive, information identify the sender 712 and the authentication code 714. The first payment instructions further includes a third set of fields 716 identifying the recipient 404 by such things as name, address and phone number. The first payment instructions 700 further includes a fourth set of fields 718 identifying the payment agent 434 who is to disburse the cash to the recipient 404.

As discussed above, the receiving bank 420 processes the first payment instructions and reformats some of the information therein into second payment instructions. As seen in FIG. 7b, the second payment instructions 730 includes much of the same content as the first payment instructions. However, there may be differences in one or more of (a) the electronic format, (b) the contents in a given field—such as in the time of creation 738 of the record, (c) the name ascribed to a given field—such as the term "Verification Code" 744 in lieu of "Authentication Code" 714, (d) the order in which the fields are arranged—such as the appearance of the "Phone" field 752 prior to the recipient's name; and (e) even in the presence of the field, as illuminated by the absence of the payment agent field 718 in the second payment instructions 730 (which are to be sent to that payment agent anyway).

From the foregoing, it can be seen that the second payment instructions are at least partially derived from the first payment instructions. Furthermore, the second payment instructions direct the payment agent to provide the funds, in cash, to said recipient.

Figure 8:
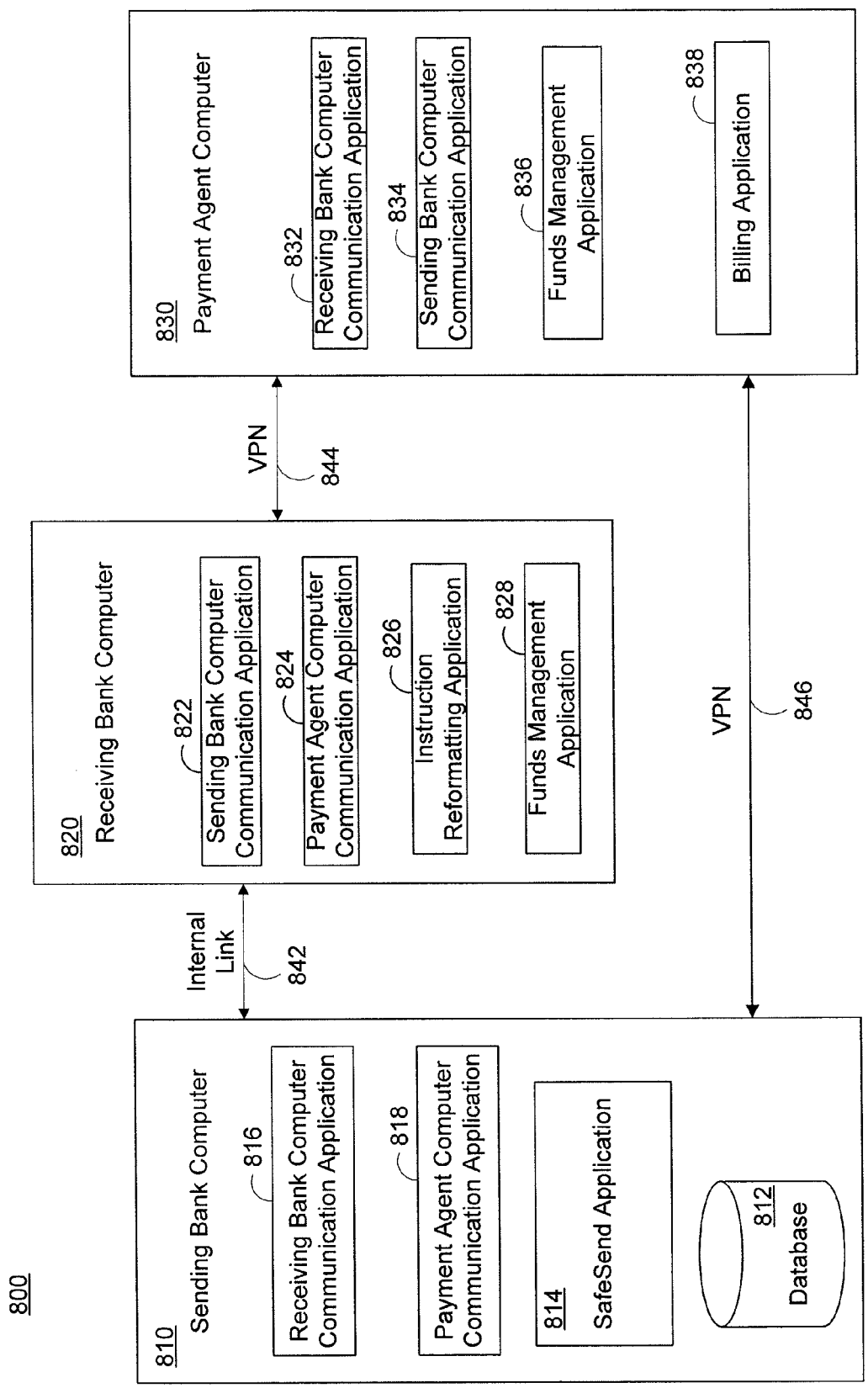
FIG. 8 shows a sketch of the computer infrastructure to enable communication among the sending bank, the receiving bank and the payment agent.

FIG. 8 shows one embodiment of the principal subsystems for use in a fund transfer system 800 in accordance with the present invention. The principal subsystems shown are the sending bank computer 810, the receiving bank computer 820 and the payment agent computer 830. It is understood that the telephone line/PSTN or the sender's computer used to provide the initial instructions by phone or over the internet, respectively, have been omitted from the fund transfer system 800 of FIG. 8 for simplicity.

It is understood that the three computers are distinct from one another and typically are not co-located. Indeed, the sending bank computer 810 and the payment agent computer 830 are almost always in different countries, while the receiving bank computer may be in either country, depending on the implementation.

Generally speaking, each of these computers is provisioned with the hardware, firmware, software applications and communications capabilities required to perform its respective duties. It is further understood that each of these three computers 810, 820, 830 are subsystems which may comprise one or more processors and even represent multiple distributed computing components.

The sending bank computer 810 has an associated database 812 which manages information about the transactions in accordance with the present invention. This database communicates with the SafeSend application 814 discussed above. In addition, the sending bank computer is provided with software applications 816, 818 suitable for communicating with the receiving bank computer 820 and the payment agent computer 830, respectively. Additional software applications (not shown) allow the sending bank computer to communicate with the remainder of the bank systems so as to gain access to account information, and the like.

The receiving bank computer 820 includes, among other things, software applications 822, 824 suitable for communicating with the sending bank computer 810 and the payment agent computer 830, respectively. The receiving bank computer 820 is also provided with an instruction reformatting application 826. The instruction reformatting application 826 permits the receiving bank computer to 'read' the first payment instructions 700 and based on the payment agent 718 designated therein, retrieve from memory payment-agent-specific information about how to reformat the information in a manner acceptable to the designated payment agent. In addition, the receiving bank computer 820 has a funds management application 828 which may be used to electronically send and receive funds into the commingled account 422.

The payment agent computer 830 includes, among other things, software applications 832, 834 suitable for communicating with the receiving bank computer 820 and the sending bank computer 830, respectively. The payment agent computer 830 is also provided with a funds management application 836 which may be used to receive funds from, and send funds to, the receiving bank computer 820. Funds may be sent back in those circumstances where the cash could not be disbursed to the recipient 404, for whatever reason.

The payment agent computer 830 also includes a billing application 838. As discussed above, in one embodiment, the value of first amount of funds specified by the sender is the same as the second amount that is deducted from the sender's account 410, which is the same as the fourth amount provided to the payment agent 434 and is identical to the fifth amount disbursed to the recipient 404. In this embodiment no fee is collected and so the bank does not realize any revenue from the transaction with which the bank may compensate the payment agent; the payment agent 434 is compensated separately. The billing application 838 keeps tracks of the fees due the payment agent for the services provided. From time to time, such as at the end of each month, the payment agent's billing application 838 sends an invoice to the sending bank 410 for services provided. By invoicing the sending bank 410 (which is in a different country) instead of the receiving bank 420 (which is in the same country), value-added-taxes for the services provided may be avoided, under certain conditions.

The three computers 810, 820, 830 communicate with one another electronically. The sending bank computer 810 and the receiving bank computer 820 communicate via an internal link 842, which may be used on an as-needed basis. In some embodiments, the internal link 842 may be dedicated. The sending bank computer 810 may periodically send a batch of accumulated first payment instructions to the receiving bank computer. Similarly, the receiving bank computer 820 need not update the status of each transaction throughout the day, but may instead wait until the end of the day and send status information for all the transactions to the sending bank computer.

The receiving bank computer 820 and the payment agent computer 830 communicate via a virtual private network (VPN) link 844 established over commercial lines. To accommodate this, the receiving bank computer 820 and the payment agent computer 830 may each be provisioned with gateways, routers and other devices. Communication between the two computers 820, 830 may take place according to pre-arranged schedules. For instance, the receiving bank computer 820 may collect a number of second payment instructions 730 over, e.g., a 30 minute time period, send them all at once to the payment agent computer 830, and wait another 30 minutes before sending the next batch. Other schemes are also possible.

The sending bank computer 810 and the payment agent computer 830 may communicate via a VPN link 846, which has also been established over commercial lines. Other arrangements are also possible for this link.

The foregoing description of an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto:

What is claimed is:

1. A method for a banking customer of a first bank in a first country to invoke a banking service of sending a first amount of cash to a recipient in a second country, the first amount of cash being in the currency of the second country, the banking customer having a bank account in the first bank, the method comprising:
   receiving, at a first bank computer associated with the first bank, information for designating a recipient of the first amount of cash and for specifying the first amount of cash to be provided to the recipient;
   updating a bank database of the first bank computer to debit the banking customer's bank account for a second amount of cash;
   transmitting to a second bank located in the second country, a first data message with information sufficient for the second bank to provide the first amount of cash to the recipient via a payment agent in the second country; and
   transferring an amount of funds equivalent in value to the first amount of cash to a commingled account belonging to the second bank.

2. The method of claim 1, wherein the second bank is an affiliate of the first bank.

3. The method of claim 1, wherein the information in the first data message comprises a first set of fields that identify a transaction, a second set of fields that include details of the transaction, a third set of fields that include details of the recipient, and a fourth set of fields that identify the payment agent.

4. The method of claim 3, wherein the first set of fields comprise a transaction routing number, retrieval access code, record creation date, and a record creation time.

5. The method of claim 3, wherein the second set of fields comprise a date and time that a transaction request expires, the first amount of cash to be sent to the recipient, a sender's name, and an authentication code.

6. The method of claim 3, wherein the third set of fields comprise a name, address, and phone number of the recipient.

7. The method of claim 3, wherein the fourth set of fields comprise a payment agent name.

8. The method of claim 1, wherein the first amount of cash in the commingled account is in currency of the first country or the second country.

9. The method of claim 1, wherein the information in the first data message is based on a sender transaction profile stored in a memory of the first bank computer.

10. The method of claim 1, wherein the first data message includes a memo to the recipient.

11. The method of claim 1, further comprising: receiving confirmation that the first amount of cash has been disbursed to the recipient.

12. The method of claim 11, further comprising: updating the bank database on the first bank computer to reflect the received confirmation.

13. The method of claim 1, further comprising: receiving an invoice from the payment agent for services provided over a predetermined period of time.

14. An apparatus for sending cash from a sending bank in a first country comprising: a database configured to store user profile information;
 a receiving bank computer communication module configured to communicate with a receiving bank in a second country for transmitting the cash to a recipient;
 a payment agent computer communication module configured to communicate with a payment agent in the second country for disbursing the cash to the recipient, wherein the payment agent computer communicates with the receiving bank computer to disburse the cash to the recipient; and
 a cash remittance module configured to manage the transmission of the cash to the recipient based on the user profile information stored in the database at the sending bank in the first country, wherein the cash is converted from a first currency in the first country to a second currency in the second country and is transmitted to the recipient through the receiving bank and the payment agent.

15. The apparatus of claim 14, wherein the user profile information comprises a date and time that a transaction request expires, a transaction amount to be sent to the recipient, a sender's name, and an authentication code.

16. The apparatus, of claim 14, further comprising: a sender communication module for receiving initial instructions from a sender with regard to the transmitting the cash to the recipient.

17. The apparatus of claim 16, wherein the initial instructions are received via a telephone line or the Internet.

18. A computer-readable storage medium, at a first bank computer located in a first country, having computer-executable program instructions stored thereon that when executed by a processor, cause the processor to perform steps comprising:
 receiving first data identifying a sender, a recipient, a payment agent, and a first amount of cash in a first currency, wherein the sender is located in a first country using the first currency, wherein the recipient is located in a second country using a second currency, wherein the payment agent is located in the second country for disbursing funds to the recipient by communicating with a second bank computer located in the second country, and wherein the first amount of cash is in the first currency;
 determining a second amount of cash in the second currency to provide to the recipient, by converting the first amount of cash into the second currency at a predetermined exchange rate; and
 sending a first data message for receipt by the second bank computer, the first data message comprising second data identifying the recipient and at least one of the first amount of cash or the second amount of cash.

19. The computer-readable storage medium of claim 18, wherein the computer-executable instructions further perform: receiving a confirmation that the second amount of cash has been disbursed to the recipient.

20. The computer-readable storage medium of claim 18, wherein the computer-executable instructions further perform: accessing a sender's user profile detailing the first and second data.

21. A first bank computer of a first bank in a first country, the first bank computer comprising:
 a processor;
 a receiving module configured to receive payment information including a first amount of cash to be provided to a recipient in a second country via a payment agent in the second country, a date that the first amount of cash is to be sent to the recipient, and an identity of the payment agent located in the second country to be used in disbursing the first amount of cash to the recipient;
 a formatting module configured to format the payment information into first payment instructions, wherein the first payment instructions include a first set of fields that identify a transaction, a second set of fields that include details of the transaction, a third set of fields that include details of the recipient, and a fourth set of fields that identify the payment agent; and
 a transmitting module configured to (a) transmit to a second bank computer associated with a second bank located in the second country, the first payment instructions and (b) transmit an amount of funds equivalent in value to the first amount of cash to a commingled account belonging to the second bank.

* * * * *